United States Patent
Wen et al.

(10) Patent No.: US 9,071,363 B2
(45) Date of Patent: Jun. 30, 2015

(54) OPTICAL TRANSMITTERS WITH UNBALANCED OPTICAL SIDEBANDS SEPARATED BY GAPS

(71) Applicant: Futurewei Technologies, Inc., Plano, TX (US)

(72) Inventors: Yangjing Wen, Cupertino, CA (US); Chunlei Liao, San Jose, CA (US); Xiao Shen, San Bruno, CA (US); Yusheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 63 days.

(21) Appl. No.: 14/024,788

(22) Filed: Sep. 12, 2013

(65) Prior Publication Data
US 2015/0071641 A1    Mar. 12, 2015

(51) Int. Cl.
*H04B 10/04* (2006.01)
*H04B 10/516* (2013.01)
*H04B 10/54* (2013.01)
*H04J 14/08* (2006.01)

(52) U.S. Cl.
CPC .......... *H04B 10/5165* (2013.01); *H04B 10/541* (2013.01); *H04J 14/08* (2013.01)

(58) Field of Classification Search
CPC ... H04B 10/5165; H04B 10/54; H04B 10/548
USPC .................................................. 398/76–79
See application file for complete search history.

(56) References Cited

U.S. PATENT DOCUMENTS

| | | | |
|---|---|---|---|
| 8,111,993 B2 | 2/2012 | Lowery | |
| 2010/0247099 A1* | 9/2010 | Lowery et al. | 398/79 |
| 2010/0329680 A1* | 12/2010 | Presi et al. | 398/79 |
| 2011/0122912 A1* | 5/2011 | Benjamin et al. | 372/50.124 |
| 2014/0199073 A1* | 7/2014 | Yu | 398/76 |

OTHER PUBLICATIONS

Ingham, et al., "Carrierless Amplitude and Phase Modulation for Low-Cost, High-Spectral-Efficiency Optical Datacommunication Links," CLEO/QELS 2010, CThC5.pdf, May 2010, 2 pages.
Lowery, "Improving Sensitivity and Spectral Efficiency in Direct-Detection Optical OFDM Systems," OFC/NFOEC 2008, OMM4.pdf, Feb. 2008, 3 pages.

(Continued)

*Primary Examiner* — Dzung Tran
(74) *Attorney, Agent, or Firm* — Conley Rose, P.C.; Grant Rodolph; Jonathan K. Polk

(57) ABSTRACT

An apparatus comprising a transmitter configured to generate an optical signal comprising a carrier modulated with at least two sidebands modulated with information, wherein the information introduces a separation gap in a frequency domain between the sidebands and the carrier, wherein one of the sidebands is an undesired sideband and another one of the sidebands is a desired sideband with a higher power intensity than the undesired sideband. A method comprising receiving an optical carrier from a light source and modulating the optical carrier with at least two sidebands modulated with information, wherein the information introduces a separation gap in a frequency domain between the sidebands and the optical carrier, wherein one of the sidebands is an undesired sideband and another one of the sidebands is a desired sideband having a higher power intensity than the undesired sideband.

20 Claims, 12 Drawing Sheets

(56) References Cited

OTHER PUBLICATIONS

Olmedo, et al, "Towards 400GBASE 4-lane Solution Using Direct Detection of MultiCAP Signal in 14 GHz Bandwidth per Lane," OFC2013, PDP5C.10.pdf, Mar. 2013, 3 pages.

Schmidt, et al., "Experimental Demonstrations of Electronic Dispersion Compensation for Long-Haul Transmission Using Direct-Detection Optical OFDM," Journal of Lightwave Technology, vol. 26, No. 1, Jan. 1, 2008, pp. 196-203.

Yan, et al., "100 Gb/s Optical IM-DD Transmission with 10G-Class Devices Enabled by 65 GSamples/s CMOS DAC Core," OFC2013, OM3H.1.pdf, Mar. 2013, 3 pages.

* cited by examiner

OPTICAL TRANSMITTERS WITH UNBALANCED OPTICAL SIDEBANDS SEPARATED BY GAPS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rapidly increasing bandwidth demand has driven the development of optical transmitters capable of providing higher speed data transmissions. One strategy for developing optical transmitters with higher speed data transmissions is to rely on higher availability for electronic and optical components. However, by using multi-level formats, for example quadrature amplitude modulation (QAM), higher speed data transmissions may be achieved without increasing transmitter electrical bandwidth requirements. The recently developed digital signal processing (DSP) technologies made the scheme promising, in which the generation and detection of multi-level formats can be easily realized in DSP. Implementing multi-level formats for optical transmissions may lead to higher required optical signal-to-noise ratio (ROSNR) than binary formats, such as non-return-to-zero. Coherent detection may satisfy the ROSNR requirements, but may not be cost-effective due to additional components, for example hybrid mixers and local oscillators.

SUMMARY

In one embodiment, the disclosure includes an apparatus comprising a transmitter configured to generate an optical signal comprising a carrier modulated with two sidebands modulated with information, wherein the information introduces a separation gap in a frequency domain between the sidebands and the carrier, wherein one of the sidebands is an undesired sideband and another one of the sidebands is a desired sideband with a higher power intensity than the undesired sideband.

In another embodiment, the disclosure includes an apparatus comprising a plurality of transmitters, wherein each of the transmitters is configured to generate an optical signal comprising a carrier modulated with two sidebands modulated with information, wherein the information introduces a separation gap in a frequency domain between the sidebands and the carrier, wherein one of the sidebands is an undesired sideband and another one of the sidebands is a desired sideband, and wherein the sidebands are unbalanced due to the desired sideband having a higher power intensity than the undesired sideband prior to transmission, and a dither signal, wherein the dither signal uniquely identifies the transmitter, and a multiplexer coupled to the plurality of transmitters, wherein each of the optical signals is centered at a unique wavelength, and wherein the multiplexer is configured to transform the plurality of optical signals into a multiplexed optical signal.

In another embodiment, the disclosure includes a method comprising receiving an optical carrier from a light source, and modulating the optical carrier with at least two sidebands modulated with information, wherein the information introduces a separation gap in a frequency domain between the sidebands and the optical carrier, wherein one of the sidebands is an undesired sideband and another one of the sidebands is a desired sideband, and wherein the sidebands are unbalanced due to the desired sideband having a higher power intensity than the undesired sideband prior to transmission.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
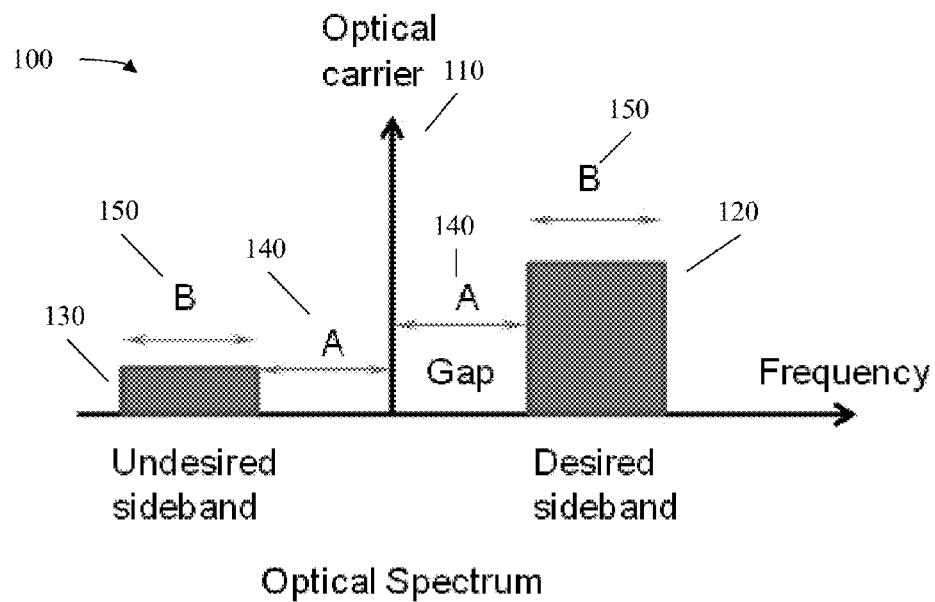
FIG. 1 is a graph of an embodiment of an unbalanced sideband optical signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and/or method for generating gapped, unbalanced sidebands by an optical transmitter. The disclosed optical transmitter may be configured to operate in both single and multi-wavelength optical systems. A separation gap between a carrier signal and the corresponding sidebands can be generated by introducing a gap between a subcarrier modulated (SCM) signal and a direct component (DC) of an electrical signal carried by the sidebands. After modulation, the sidebands may become unbalanced by passing the optical signal through an optical filter to retain a desired sideband and suppress an undesired sideband. In some instances, the sidebands may become unbalanced through modulating the carrier. For example, the sidebands may become unbalanced through a frequency chirping introduced while intensity modulating (e.g. directly or externally modulation) the carrier. Also, the sidebands may become unbalanced through modulating the carrier by driving either a DE-MZM or an in-phase/quadrature modulator (I/Q) with the electrical signal and its Hilbert transform. In a multi-wavelength system, the sidebands may become unbalanced and the carriers suppressed for each wavelength by offsetting the passband peak corresponding to each wavelength from the carrier center frequency to the center frequency of the desired sideband. Also, the unbalanced sidebands and suppressed carriers may be generated by an optical filter positioned after a multiplexer. A light source generating a carrier may be wavelocked by sampling the optical signal before and after the optical filter, converting the samples to electrical signals through photo-detection, and forwarding the electrical signals to a control unit that may generate a wavelocking signal based upon the electrical signals. Wavelocking may similarly be performed in a multi-wavelength system by inserting a dither signal into each wavelength's optical signal so that the control unit may uniquely identify each wavelength's optical signal for wavelocking purposes. An unbalanced sideband, carrier suppressed optical signal may be designed according to a sideband separation gap, a carrier-to-signal power ratio (OCSPR), and a single sideband suppression ratio (SSSR). In a preferred embodiment, the sideband separation gap may be set above 0.1 times the 3 decibel (dB) sideband bandwidth, the OCSPR may be set in a range of −15 dB to +15 dB, and the SSSR may be set to at least 5 dB.

Direct detection (DD) optical systems may be more cost effective for short reach systems (e.g. metro access networks), in part due to a less complicated implementation. Multi-level formats, including baseband modulation and SCM, may enable DD optical transmission systems to meet the required optical signal-to-noise ratio (ROSNR). However, the ROSNR performance of DD optical systems may depend on the performance of the optical transmitters used. The disclosed optical transmitter capable of generating unbalanced optical sidebands with a gap between the carrier and each sideband may improve the ROSNR performance of a DD optical system. The disclosed optical transmitter may also be expanded for multi-wavelength optical systems to further increase the bandwidth of the optical system. The ROSNR performance may be improved with the disclosed optical transmitter by controlling the gap between the carrier and each sideband, the carrier-to-signal power ratio (CSPR), and the SSSR.

FIG. 1 is a graph of an embodiment of an unbalanced sideband optical signal 100. Optical signal 100 may comprise an optical carrier 110 modulated with two optical sidebands. In an embodiment, optical carrier 110 may have continuous wave (CW) characteristics. Optical carrier 110 may experience phase noise characterized by a laser linewidth and intensity noise characterized by a relative intensity noise (RIN). Also, the RIN may not have a flat distribution around the frequency of optical carrier 110. The optical sidebands may exhibit uneven intensities, in which the optical sideband with a higher intensity may be referred to as a desired sideband 120 and the optical sideband with a lower intensity may be referred to as an undesired sideband 130. In an embodiment, desired sideband 120 and undesired sideband 130 may be mirror images, and thus carry substantially similar data on one or more subcarriers. Also, desired sideband 120 may be centered at a frequency above optical carrier 110 and undesired sideband 130 may be centered at a frequency below optical carrier 110, or vice versa.

Optical signal 100 may be characterized by a plurality of characteristics, such as a separation gap A 140, a sideband bandwidth B 150, a single sideband suppression ratio (SSSR), and/or an optical carrier-to-signal power ratio (OCSPR). In the frequency domain, separation gap A 140 may define a separation gap between optical carrier 110 and its respective sidebands (i.e. desired sideband 120 and undesired sideband 130). Separation gap A 140 may be introduced to permit a signal-signal beating induced interference to be separated from a useful signal, which comprises a carrier-signal beating. In an embodiment, separation gap A 140 between optical carrier 110 and desired sideband 120 may be substantially similar to separation gap A 140 between optical carrier 110 and undesired sideband 130. An optical transmitter (Tx) may introduce separation gap A 140 in electrical data through digital and/or analog signal processing. For example, a Tx utilizing carrierless amplitude and phase (CAP) modulation may adjust separation gap A 140 by adjusting a subcarrier frequency of a CAP filter. Separation gap A 140 may also be introduced by generating gapped SCM data in the electrical domain to be modulated onto an optical carrier frequency. The gapped SCM data may be realized through both single SCM and multi-SCM techniques by selecting an appropriate subcarrier frequency (or frequencies). Also, the gapped SCM data may be modulated using various multi-level formats comprising quadrature phase-shift keying (QPSK) and quadrature amplitude modulation (QAM).

Sideband bandwidth B 150 may define a 3 dB or half power bandwidth for both desired sideband 120 and undesired sideband 130. The 3 dB bandwidth of an optical sideband may be defined as a frequency range between an upper sideband cutoff frequency and a lower sideband cutoff frequency. The upper sideband cutoff frequency may be at a frequency above a sideband peak intensity frequency where the sideband intensity is about 3 dB lower than a sideband peak intensity. Similarly, the lower sideband cutoff frequency may be at a frequency below the sideband peak intensity frequency where the sideband intensity is about 3 dB lower than the sideband peak intensity. Separation gap A 140 width may be measured in the optical domain by a frequency difference between a center frequency of optical carrier 110 and the closest cutoff frequency of the corresponding optical sideband to the optical carrier center frequency used to determine the sideband bandwidth. Alternatively, sideband bandwidth B 150 and separation gap A 140 may be measured utilizing an electrical spectrum of data before it is used to modulate the Tx. A signal symbol rate and pulse shaping filter parameters if pulse shaping is applied (e.g. filter type and/or roll-off factor) may determine sideband bandwidth B 150.

An SSSR may be defined for optical signal 100 as a power ratio of desired sideband 120 to undesired sideband 130. Thus, if the SSSR becomes sufficiently large (or small), optical signal 100 may become a single sideband optical signal. An OCSPR may also be defined for optical signal 100 as a power ratio of optical carrier 110 to the sum of the desired sideband 120 and the undesired sideband 130. Balanced, double sideband optical signals may have an OCSPR about 6 dB higher than an electrical domain carrier-to-signal power ratio (CSPR), which may be measured in either a time or frequency domain. Selecting a sufficient separation gap A 140 may depend on the OCSPR of the optical signal 100, which may increase with a reduction of an absolute OCSPR. A low OCSPR (e.g. about 0 dB) may necessitate a large separation gap A 140 about equal to bandwidth B 150. Alternatively, a large OCSPR (e.g. Txs utilizing small signal modulation) may necessitate a small separation gap A 140. In an embodiment, an intensity-modulated (IM) SCM Tx without optical carrier suppression having a relatively large OCSPR may only necessitate a separation gap A 140 of about 0 Hz. Also, a minimum back-to-back (BtB) ROSNR may depend on both the OCSPR and separation gap A 140 of optical signal 100. A minimal BtB ROSNR may result from a large separation gap A (e.g. separation gap A≥sideband bandwidth B) and a low OCSPR (e.g. ≈0 dB) since a maximum beating product may occur when the intensity of an optical carrier and optical sidebands are about equal.

A Tx capable of generating optical signal 100 may experience an improved fiber dispersion tolerance due to the unbalanced optical sidebands. The improvement in fiber dispersion tolerance may be realized in part through a larger SSSR. A dispersion induced radio frequency (RF) power fading resulting from a phase difference between the two optical sidebands may be essentially eliminated if the SSSR becomes sufficiently large. In addition to the increased fiber dispersion tolerance, the Tx may also exhibit a reduced ROSNR, and/or an improvement in receiver sensitivity (i.e. a lower received optical power for a given BER) when the separation gap A 140, OCSPR, and/or SSSR parameters are properly defined. The Tx capable of generating optical signal 100 may be realized in several ways comprising an IM-Tx coupled to an optical filter, a DE-MZM with a Hilbert transform, and an I/Q modulator with a Hilbert transform.

Figure 2:
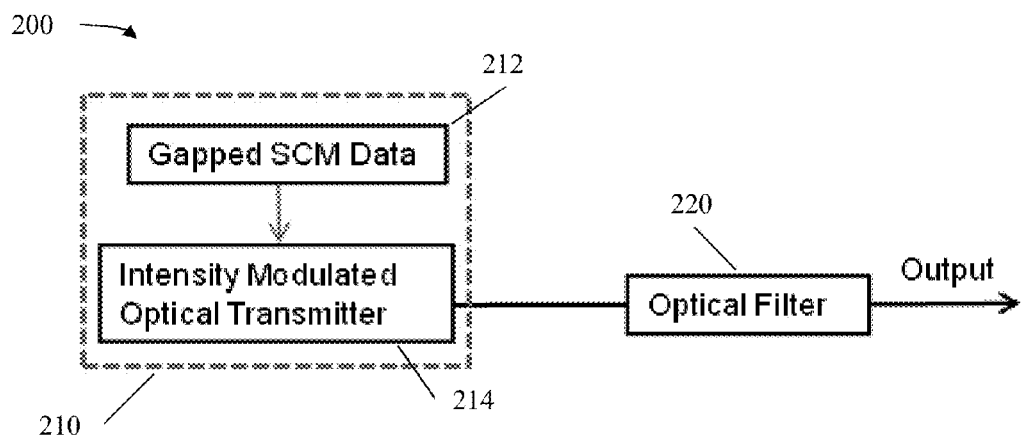
FIG. 2 is a schematic diagram of an embodiment of an intensity modulated (IM) transmitter (Tx) configured to generate an optical signal with a suppressed carrier and gapped, unbalanced optical sidebands.

FIG. 2 is a schematic diagram of an embodiment of an IM-Tx 200 configured to generate an optical signal with a suppressed carrier and gapped, unbalanced optical sidebands (e.g. optical signal 100 of FIG. 1). IM-Tx 200 may comprise an SCM-Tx 210 and an optical filter 220. SCM-Tx 210 may comprise a gapped SCM data block 212 and an IM electrical-to-optical (E/O) modulator 214. Gapped SCM data block 212 may be configured to forward an SCM electrical signal with a separation gap between a direct component (DC) and an SCM signal. The SCM electrical signal may be generated using DSP or analog signal processing (ASP) techniques. The separation gap may be introduced between the DC and SCM signal to mitigate any signal-to-signal beating and/or subcarrier-to-subcarrier beating induced interference arising from photo-detection. Suppressing an optical carrier of an SCM IM signal may reduce the CSPR and increase the power efficiency. However, suppressing the optical carrier along without the separation gap may not mitigate the beating induced interference. In an embodiment, SCM-Tx 210 may further comprise an electrical amplifier and/or a driver (not shown) intervening between gapped SCM data block 212 and IM-E/O modulator 214. In this embodiment, a driver with enhanced linearity may be required if SCM data block 212 processes multi-level format, SCM electrical signal. IM-E/O modulator 214 may be configured to convert the SCM electrical signal into an IM optical signal comprising an optical carrier with two optical sidebands by intensity modulating the optical carrier. The IM optical signal may be forwarded by IM-E/O modulator 214 to optical filter 220. Optical filter 220 may be configured to generate a filtered optical signal with a suppressed carrier and two unbalanced sidebands by suppressing an undesired sideband's intensity. Also, optical filter 220 may be further configured to suppress the optical carrier's intensity.

Figure 3A:
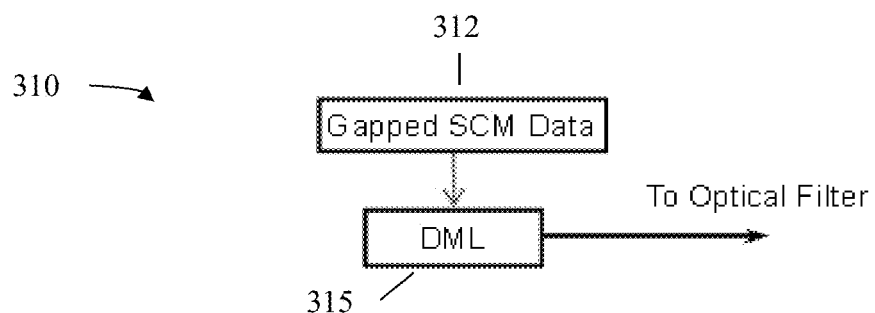
FIG. 3A is a schematic diagram of an embodiment of an IM-Tx utilizing direct IM.
Figure 3B:
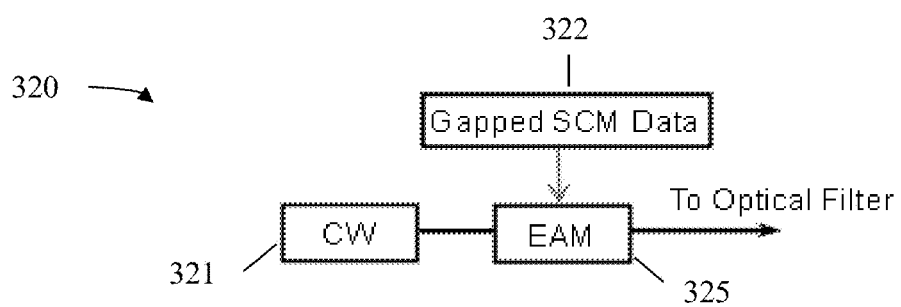
FIG. 3B is a schematic diagram of an embodiment of an IM-Tx utilizing external IM.
Figure 3C:
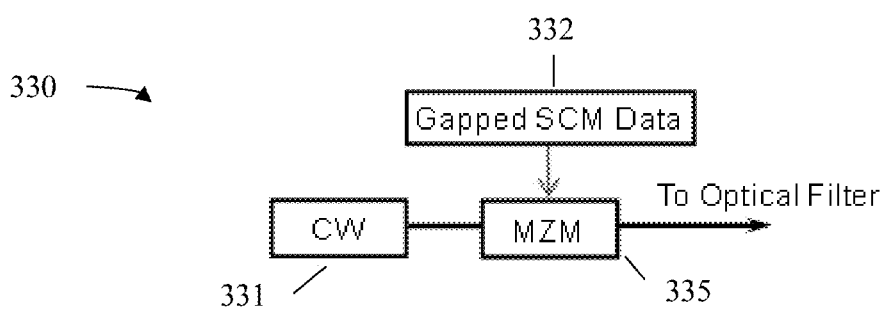
FIG. 3C is a schematic diagram of another embodiment of an IM-Tx utilizing external IM.

Several forms of IM, including direct and external modulation, may be used to implement the IM-E/O modulator of an IM-Tx (e.g. IM-Tx 200 of FIG. 2). FIGS. 3A-3C are schematic diagrams of alternate embodiments of an IM-Tx. FIG. 3A is a schematic diagram of an embodiment of an IM-Tx 310 utilizing direct IM. FIG. 3B is a schematic diagram of an embodiment of an IM-Tx 320 utilizing external IM. FIG. 3C is a schematic diagram of another embodiment of an IM-Tx 330 utilizing external IM. In FIG. 3A, IM-Tx 310 may comprise an SCM data block 312, which may be similar to SCM data block 212 of FIG. 2, and a directly modulated laser (DML) 315. DML 315 may be configured to receive an SCM electrical signal with a separation gap from SCM data block 312. The electrical signal may be used by DML 315 to directly modulate a laser diode (e.g. a distributed feedback laser or a vertical cavity surface emitting laser). DML 315 may output an IM optical signal comprising an optical carrier with two optical sidebands to an optical filter.

In FIG. 3B, IM-Tx 320 may comprise an SCM data block 322, which may be similar to SCM data block 212 of FIG. 2, a CW laser 321 and an electro-absorption modulator (EAM) 325. CW laser 321 may be an optical signal source (e.g. a gas, solid-state, semiconductor, or dye laser) that may be continuously pumped and continuously output an optical signal. EAM 325 may be configured to receive the optical signal from CW laser 321 and a subcarrier modulated electrical signal with a separation gap from SCM data block 322. The electrical signal may be used by EAM 325 to modulate the intensity of the optical signal. EAM 325 may output an IM optical signal comprising an optical carrier with two optical sidebands to an optical filter.

In FIG. 3C, IM-Tx 330 may comprise an SCM data block 332, which may be similar to SCM data block 212 of FIG. 2, a CW laser 331, which may be similar to CW laser 321, and a Mach-Zehnder modulator (MZM) 335. MZM 335 may be configured to receive an optical signal from CW laser 331 and a subcarrier modulated electrical signal with a separation gap from SCM data block 332. The electrical signal may be used by MZM 335 to modulate the intensity of the optical signal. MZM 335 may output an IM optical signal comprising an optical carrier with two optical sidebands to an optical filter.

In addition to different nonlinear dynamics, an optical signal from direct IM of an SCM electrical signal may exhibit different frequency chirping characteristics than an optical signal from external IM of an SCM electrical signal. These different frequency chirping characteristics may be important when designing an optical filter for unbalanced optical sideband generation and carrier suppression. An IM-Tx may output an SCM modulated optical signal aligned in the frequency domain to a wavelength of an optical filter for this further processing. The optical filter may be implemented with any type of optical filter that can suppress one of the optical sidebands and suppress the optical carrier (e.g. an arrayed waveguide grating, a thin-film filter and/or any interferometric type filter).

Figure 4:
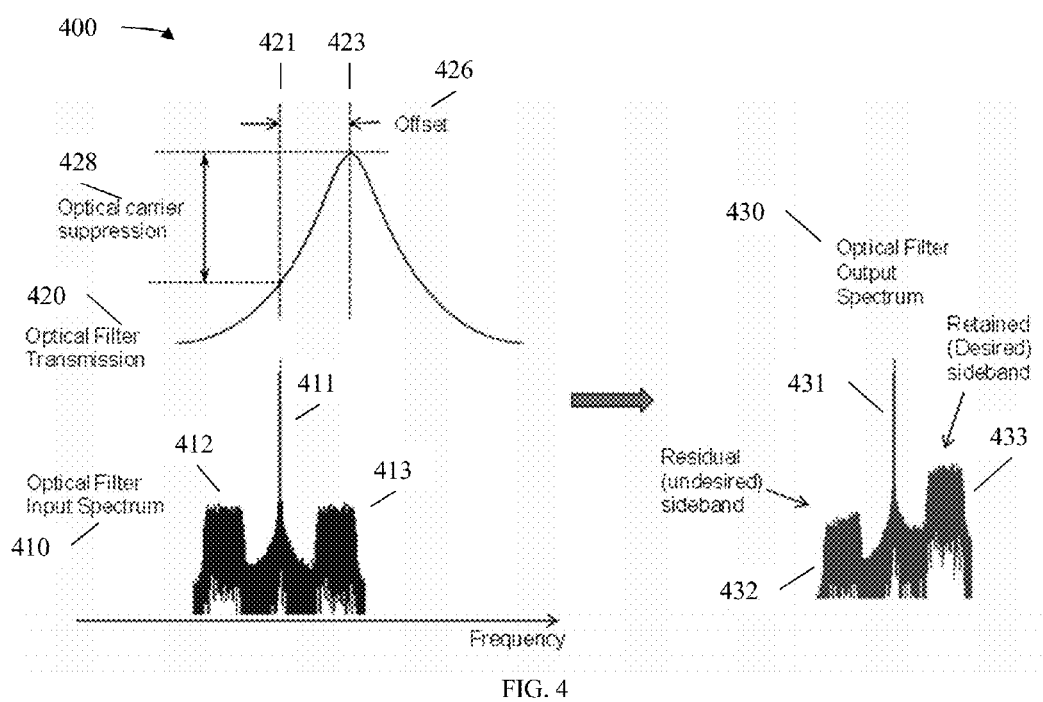
FIG. 4 depicts an embodiment of a method of gapped, unbalanced optical sideband generation and carrier suppression through optical filtering.

FIG. 4 depicts an embodiment of a method 400 of gapped, unbalanced optical sideband generation and carrier suppression through optical filtering. Method 400 may begin with an input IM optical signal 410 (e.g. optical signal 100) at an input of an optical filter (e.g. optical filter 220 of FIG. 2) in the frequency domain. Input IM optical signal 410 may comprise a non-suppressed carrier 411, a sideband centered at a lower frequency than the carrier (red sideband) 412, and a sideband centered at a higher frequency (blue sideband) 413. During IM no frequency chirping may have been introduced into input IM optical signal 410, and consequently the red sideband 412 and the blue sideband 413 may be of a similar intensity at the optical filter input. As an example of input IM optical signal 410, the input IM optical signal 410 may be CAP with 16 QAM modulated optical signal, where a square root raised cosine Nyquist filter with a roll-off factor of 0.15 may be used as a CAP filter for pulse shaping. In method 400, blue sideband 413 may be designated as a desired sideband and red sideband 412 may be designated as an undesired sideband. The optical filter may comprise an optical filter response curve 420 to suppress red sideband 412 and carrier 411. Optical filter response curve 420 may be characterized by a carrier suppression 428 at a filter transmission peak offset 426. The filter transmission peak offset 426 may represent a shift of a filter transmission peak from a carrier center frequency 421 to a blue sideband center frequency 423. Thus, carrier 411 and red sideband 412 may fall at a lower amplitude response of the optical filter response curve 420 than blue sideband 413. In method 400, a filtered IM optical signal 430 may be an output of the optical filter after input IM optical signal 410 passes through the optical filter. The filtered IM optical signal 430 may comprise a suppressed carrier 431, a suppressed red sideband 432 and a retained blue sideband 433. Both the suppressed carrier 431 and the suppressed red sideband 432 may have a reduced intensity relative to carrier 411 and red sideband 412, respectively due to the optical filter's roll-off in their frequency band. Suppressed red sideband 432 may experience a greater reduction in intensity than suppressed carrier 431. This greater reduction in intensity may be a result of suppressed red sideband 432 falling at a lower amplitude response of the optical filter response curve 420 than suppressed carrier 431. The relative difference in intensity reduction between suppressed carrier 431 and suppressed red sideband 432 may be dependent on a filter shape of the optical filter and the size of the filter transmission peak offset 426. A preferred embodiment of the optical filter may achieve the greatest intensity reduction of suppressed red sideband 432 as possible. The level of intensity reduction for suppressed carrier 431 may be dependent on the OCSPR of input IM optical signal 410. A modulation index of input IM optical signal 410 may be small to avoid modulation nonlinearity, which may contribute to a higher CSPR. The higher CSPR of input IM optical signal 410 may necessitate a greater level of intensity reduction for suppressed carrier 431 to achieve a low ROSNR. A preferred embodiment of the optical filter may realize an intensity reduction for suppressed carrier 431 that results in a similar intensity as retained blue sideband 433.

Figure 5:
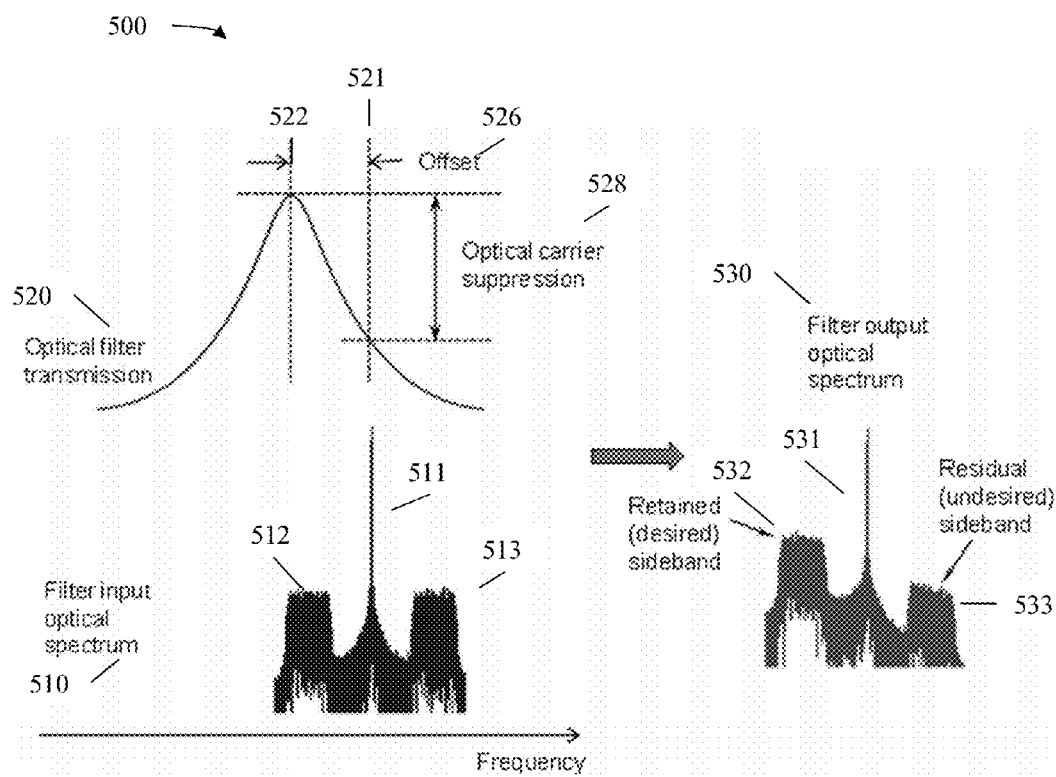
FIG. 5 depicts another embodiment of a method of unbalanced optical sideband generation and carrier suppression through optical filtering.

FIG. 5 depicts another embodiment of a method 500 of gapped, unbalanced optical sideband generation and carrier suppression through optical filtering. Method 500 may begin with an input IM optical signal 510, which may be similar to input IM optical signal 410, at an input of an optical filter in the frequency domain. In method 500, red sideband 512 may be designated as a desired sideband and blue sideband 513 may be designated as an undesired sideband. The optical filter may comprise an optical filter response curve 520 to suppress blue sideband 513 and carrier 511. The optical filter response curve 520 may be characterized by a carrier suppression 528, which may be similar to carrier suppression 428 of FIG. 4, at a filter transmission peak offset 526. The filter transmission peak offset 526 may represent a shift of a filter transmission peak from a carrier center frequency 521 to a red sideband center frequency 522. Thus, carrier 511 and blue sideband 513 may fall at a lower amplitude response of the optical filter response curve 520 than red sideband 512. In method 500, a filtered IM optical signal 530 may be an output of the optical filter after input IM optical signal 510 passes through the optical filter. Filtered IM optical signal 530 may be similar to filtered IM optical signal 430 except red sideband 512 may be retained and blue sideband 513 may be suppressed.

Figure 6:
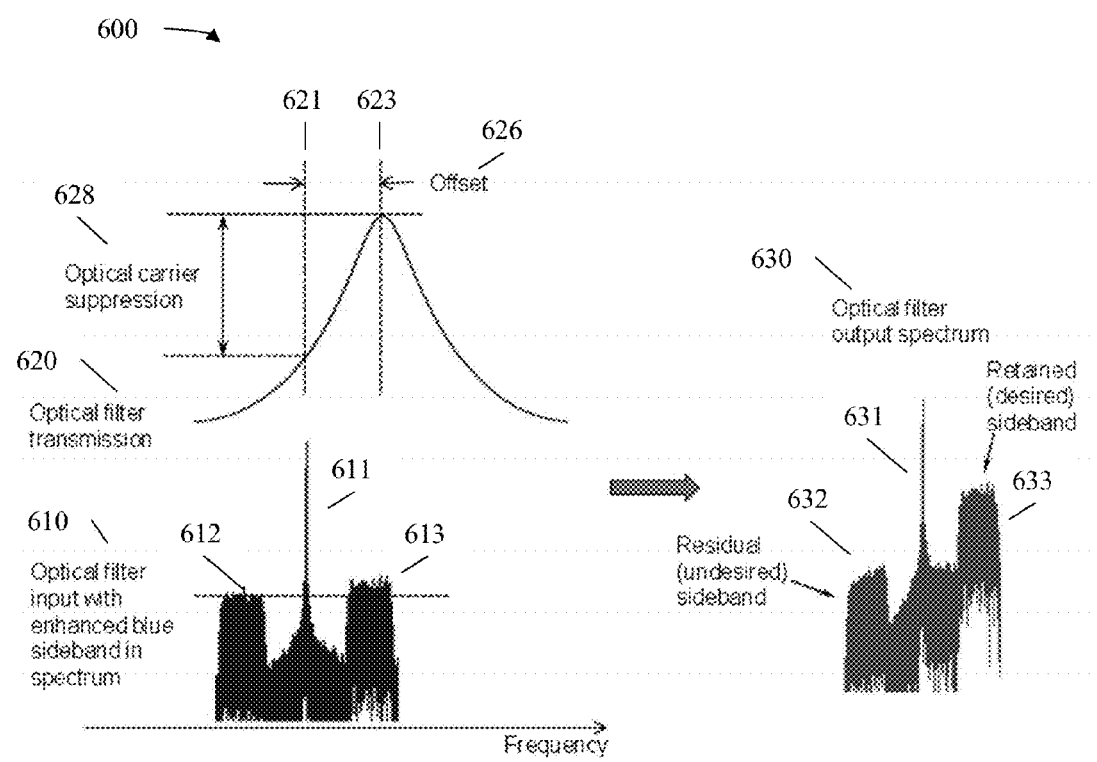
FIG. 6 depicts another embodiment of a method of unbalanced optical sideband generation and carrier suppression through optical filtering.

FIG. 6 depicts another embodiment of a method 600 of gapped, unbalanced optical sideband generation and carrier suppression through optical filtering. Input IM optical signals 410 and 510, of FIGS. 4 and 5 respectively, may comprise optical sidebands of equal intensity. However, IM of optical signals may induce frequency chirping that may result in one sideband having a higher intensity than the other sideband at an optical filter input. For example, direct modulation of a laser diode may result in a positive frequency chirping where a blue sideband may have a higher intensity at an optical filter input than a red sideband. In another example, an EAM of a laser diode may induce a negative chirp where a red sideband may have a higher intensity at an optical filter input than a blue sideband. Therefore, the presence of frequency chirping on an input IM optical signal may impact the decision of which sideband to retain during unbalanced optical sideband generation.

In an embodiment, direct modulation of a laser diode with a single clock tone may demonstrate asymmetry of an IM optical signal's sidebands, which may arise due to frequency chirping. The optical power of a directly modulated semiconductor laser with a single tone clock, may be expressed as:

Equation 1

$$P(t) = P_{ave}[1 + m\cos(\Omega t)] \quad (1)$$

Where:

$P(t)$ = an output optical power $P_{ave}$ = an average optical power $m$ = a modulation index $\Omega$ = a modulation angle frequency Also, assuming small signal modulation, the frequency chirp may expressed as:

Equations 2, 3, and 4

$$\Delta v(t) = \frac{\alpha}{4\pi}\left[\frac{1}{P(t)}\frac{dP(t)}{dt} + \kappa\Delta P(t)\right] \quad (2)$$

$$\kappa = \frac{2\Gamma\epsilon}{V\eta_0 h v_0} \quad (3)$$

$$v_0 = \frac{\omega_0}{2\pi} \quad (4)$$

Where:
$\Delta v(t)$=a frequency chirp
$\alpha$=a linewidth enhancement factor
$\Gamma$=an optical confinement factor
$\epsilon$=a gain compression factor
V=an active area volume
$\eta_0$=a differential quantum efficiency
h=Planck's constant
$\omega_0$=an optical carrier angle frequency If an adiabatic chirp is considered and a transient chirp is ignored, Equation 2 may be expressed as:

Equation 5

$$\Delta v(t) = \frac{\alpha\kappa}{4\pi}\Delta P(t) = \frac{\alpha\kappa m P_{ave}}{4\pi}\cos(\Omega t) \quad (5)$$

In addition, an optical field may be expressed as:

Equations 6, 7, 8, and 9

$$E(t) = \sqrt{P(t)}\,e^{j\omega_0 t + j\phi(t)} \quad (6)$$

$$\phi(t) = 2\pi\int_0^t \Delta v(\tau)d\tau = \frac{\alpha\kappa m P_{ave}}{4\pi f}\sin(\Omega t) = \chi\sin(\Omega t) \quad (7)$$

$$f = \frac{2\pi}{\Omega} \quad (8)$$

$$\chi = \frac{\alpha m P_{ave}}{4\pi f}\frac{2\Gamma\epsilon}{V\eta_0 h v_0} \quad (9)$$

Where:
E(t)=an output field
$\phi$(t)=an optical phase
f=a modulation frequency

The optical field may also be expressed as:

Equations 10, 11, 12, 13 and 14

$$E(t) = \sqrt{P_{ave}}\left(1 + \frac{m}{2}\cos(\Omega t)\right)e^{j\omega_0 t + j\chi\sin(\Omega t)} \quad (10)$$

$$= \sqrt{P_{ave}}\left(1 + \frac{m}{4}(e^{j\Omega t} + e^{-j\Omega t})\right)e^{j\omega_0 t}e^{j\chi\sin(\Omega t)} \quad (11)$$

Using a Jacobi-Anger expansion: (12)

$$e^{j\chi\sin(\Omega t)} = \sum_{n=-\infty}^{\infty} J_n(\chi)e^{jn\Omega t}$$

And $$J_{-n}(\chi) = (-1)^n J_n(\chi) \quad (13)$$

Thus, the optical field becomes:

$$E(t) = \sqrt{P_{ave}}\left\{J_0(\chi)e^{j\omega_0 t} + \left(\frac{m}{4}J_0(\chi) + J_1(\chi) + \frac{m}{4}J_2(\chi)\right)e^{j(\omega_0+\Omega)t} + \left(\frac{m}{4}J_0(\chi) - J_1(\chi) + \frac{m}{4}J_2(\chi)\right)e^{j(\omega_0-\Omega)t} + \text{higher order terms}\right\} \quad (14)$$

Where:
E(t)=an output field
$\phi$(t)=an optical phase

The optical power at the carrier may be expressed as:

Equations 15, 16, and 17

$$P_0 = J_0(\chi)P_{ave} \quad (15)$$

At the upper frequency $\omega_0+\Omega$:

$$P_{+1} = \left[\frac{m}{4}J_0(\chi) + J_1(\chi) + \frac{m}{4}J_2(\chi)\right]^2 P_{ave} \quad (16)$$

And at the lower frequency $\omega_0-\Omega$:

$$P_{-1} = \left[\frac{m}{4}J_0(\chi) - J_1(\chi) + \frac{m}{4}J_2(\chi)\right]^2 P_{ave} \quad (17)$$

If $\alpha=0$ and $\chi=0$, $J_0(0)$ may equal 1, $J_1(0)$ may equal 0, and $J_2(0)$ may equal 0. Thus, there may be no change in optical power at the carrier and both sidebands. Also, if $\alpha>0$, and other physical laser parameters are in a region of interest, $J_0(0)$, $J_1(0)$, and $J_2(0)$ may all be greater than 0. At a first-order approximation, the optical power at the upper sideband may be increased, the optical power at the lower sideband frequency may be lower than the upper sideband, and the optical carrier may be reduced.

Therefore, a frequency chirp may introduce asymmetry in the optical spectrum of an IM optical signal. For example, method 600 may begin with an input IM optical signal 610 at an input of an optical filter in the frequency domain. One difference between input IM optical signal 610 and both input IM optical signals 410 and 510 may be that input IM optical signal 610 may experience positive chirping during modulation (e.g. DML with positive chirping). Thus, blue sideband 613 may have a greater intensity than red sideband 612 and carrier 611 may have a lower intensity than carrier 411 and carrier 511 of FIGS. 4 and 5 respectively. In method 600, retaining blue sideband 613 as a desired sideband while suppressing red sideband 612 as an undesired sideband may be preferable. An optical filter may comprise an optical filter response curve 620, which may be similar to optical filter response curve 420, to suppress red sideband 612 and carrier 611. However, method 600 may require a lower carrier suppression 626 than in method 400 while maintaining a similar OCSPR as method 400, which may lead to a lower filter transmission loss. Filtered IM optical signal 630 may be similar to filtered IM optical signal 430, but the intensity of retained blue sideband 633 may be enhanced by the positive frequency chirp. Also, suppressed red sideband 632 may have a lower intensity than suppressed red sideband 432 in part as a result of the positive frequency chirp, which may also facilitate a further suppression of suppressed red sideband 632.

Furthermore, as IM of an optical signal may generate unbalanced optical sidebands without further processing (e.g. due to frequency chirping), an optical filter may not be required for some short distance transmissions.

Figure 7:
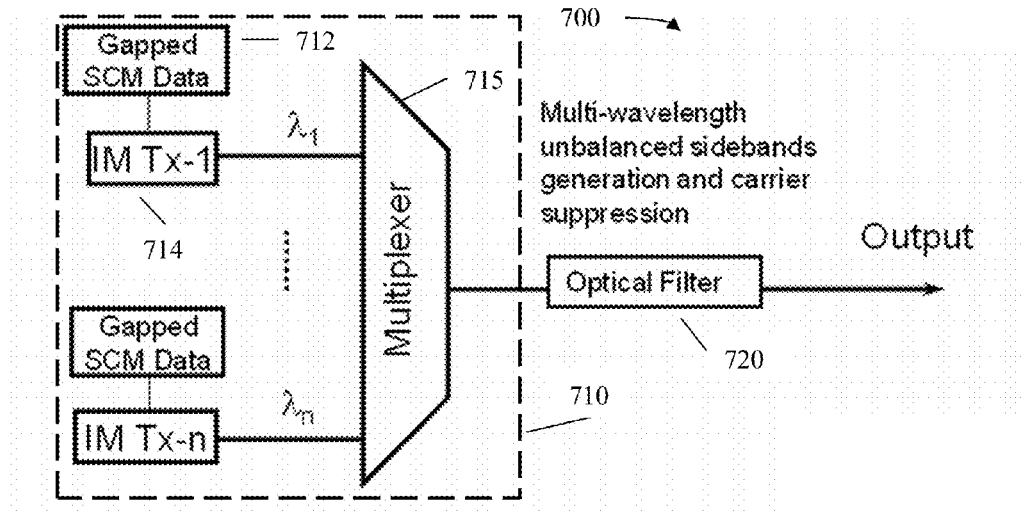
FIG. 7 is a schematic diagram of an embodiment of a multi-wavelength IM-Tx configured to generate a plurality of carrier suppressed, multi-wavelength optical signals with gapped, unbalanced optical sidebands.

The disclosed methods for generating optical signals with gapped, unbalanced optical sidebands may similarly be implemented when multi-wavelength optical transmitters are used. FIG. 7 is a schematic diagram of an embodiment of a multi-wavelength IM-Tx 700 configured to generate a plurality of carrier suppressed, multi-wavelength optical signals with gapped, unbalanced optical sidebands. Multi-wavelength IM-Tx 700 may comprise a multi-wavelength SCM-Tx 710 and an optical filter 720, which may be similar to optical filter 220 of FIG. 2 respectively. Multi-wavelength SCM-Tx 710 may comprise a plurality of SCM data blocks 712 coupled to a plurality of IM-E/O modulators 714. Each of the plurality of SCM data blocks 712 and IM-E/O modulators 714 may be similar to SCM data block 212 and IM-E/O modulator 214 of FIG. 2 respectively. The plurality of IM-E/O modulators 714 may be realized through any combination of IM-Txs (e.g. IM-Tx 310 of FIG. 3A, IM-Tx 320 of FIG. 3B, and/or IM-Tx 330). Multi-wavelength SCM-Tx 710 may further comprise multiplexer 715 (e.g. an arrayed waveguide gratings multiplexer) configured to receive an IM optical signal from each of the plurality of IM-E/O modulators 714, combine each of the plurality of IM optical signals into a single, multi-wavelength IM optical signal, and forward the multi-wavelength IM optical signal to optical filter 720.

Similar to SCM data block 212 of FIG. 2, each of the plurality of SCM data blocks 712 may be configured to forward an SCM electrical signal with a separation gap between a DC and a SCM signal. The SCM electrical signals may be generated either locally or remotely using DSP or analog signal processing (ASP) techniques. Similar to optical signal 100, each of the plurality of SCM electrical signals may comprise an optical carrier modulated with two optical sidebands. Each of the plurality of SCM electrical signals may be realized through both single subcarrier modulation and multi-subcarrier modulation techniques by selecting an appropriate subcarrier frequency. Also, each of the plurality of SCM electrical signals may be modulated using various multi-level formats comprising QPSK and QAM. In addition, each of the plurality of SCM electrical signals may comprise a unique SCM signal. In an embodiment, at least one of the plurality of SCM electrical signals may be modulated using a different format and may carry data on a different number of subcarriers than the other SCM electrical signals. A driver and/or an electrical amplifier (not shown) may also be needed between at least one of the SCM data blocks 712 and the corresponding IM-E/O modulator 714.

Optical filter 720 may be configured to generate a plurality of IM optical signals with two unbalanced sidebands by suppressing an undesired sideband's intensity. Also, optical filter 720 may be further configured to suppress each of the optical carrier's intensities. In an embodiment, optical filter 720 may be any interferometric filter with periodic transmission, including but not limited to an etalon or multi-mirror interferometer. Optical filter 720 may comprise a free spectral range (FSR) that may be designed to be equal to or at a sub-harmonic of the multi-wavelength IM optical signal's channel spacing. The filter shape of optical filter 720 may be determined by the filter surface reflectance, the incidence angle, and the number of mirrors, which may depend on required suppression ratios for the plurality of optical carriers and undesired sidebands. In an embodiment, an additional optical filter may be introduced for unbalanced optical sideband generation and carrier suppression, which may provide more flexibility in the OCSPR and SSSR of a filter design. In another embodiment, multiplexer 715 may be used to generate unbalanced sidebands and suppress the optical carriers without an additional optical filter. An offset between a center frequency of an optical carrier and a corresponding multiplexer passband peak may be introduced to achieve optical carrier suppression and generate unbalanced sidebands. Optical filter 720 may be implemented for unbalanced sideband generation and optical carrier suppression to provide more flexibility in a filter design in terms of OCSPR and SSSR.

Figure 8:
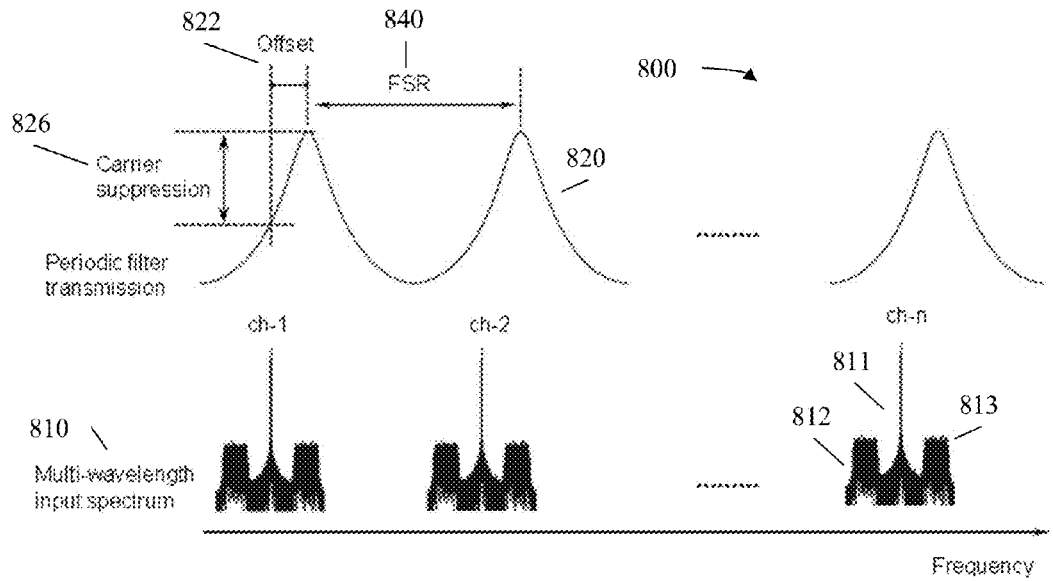
FIG. 8 depicts an embodiment of a method of gapped, unbalanced optical sideband generation and carrier suppression through optical filtering for a multi-wavelength IM-Tx.

FIG. 8 depicts an embodiment of a method 800 of gapped, unbalanced optical sideband generation and carrier suppression through optical filtering for a multi-wavelength IM-Tx. Method 800 may begin with an input multi-wavelength IM optical signal 810 at an input of an optical filter (e.g. optical filter 720 of FIG. 7) in the frequency domain. Input multi-wavelength IM optical signal 810 may comprise a plurality of non-suppressed carriers 811, a plurality of red sidebands 812, and a plurality of blue sidebands 813. The optical filter may comprise an optical filter response curve 820 to suppress a plurality of undesired sidebands (e.g. a combination of the plurality of red sidebands 812 and blue sidebands 813) and the plurality of non-suppressed carriers 811.

Filter response curve 820 may comprise a plurality of filter transmission peaks (e.g. filter transmission peak offset 822) and a plurality of carrier suppressions (e.g. carrier suppression 826). Each of the plurality of filter transmission peak offsets may represent a shift of a filter transmission peak from a carrier center frequency to a desired sideband center frequency. Thus, each of the plurality of non-suppressed carriers 811 and each of the plurality of undesired sidebands may fall at a lower amplitude response of the optical filter response curve 820 than each of the plurality of desired sidebands. In method 800, a filtered multi-wavelength IM optical signal may be an output of the optical filter after input multi-wavelength IM optical signal 810 passes through the optical filter. In method 800, the optical filter may further comprise an FSR 840, which may be equal to a channel spacing of input multi-wavelength IM optical signal 810. As depicted in FIG. 8, each of the plurality of non-suppressed carriers 811 may be located at a lower amplitude response of the optical filter response curve 820. Therefore, each of the plurality of blue sidebands 813 may be retained while each of the plurality of red sidebands 812 may be suppressed. Method 800 may be preferred when input multi-wavelength IM optical signal 810 has a positive frequency chirp (e.g. an IM-DML).

Alternatively, each of the filter transmission peak offsets 822 may be shifted to a corresponding red sideband 812 center frequency. Thus, each of the plurality of non-suppressed carriers 811 and each of the plurality of blue sidebands 813 may fall at a lower amplitude response of the optical filter response curve 820 than each of the plurality of red sidebands 812. This embodiment may be preferred when input multi-wavelength IM optical signal 810 has a negative frequency chirp.

In another embodiment, this method may cover a scenario where some channels of input multi-wavelength IM optical signal 810 may be located at a lower frequency part of the optical filter response curve 820 while other channels may be located at an upper frequency part. This may provide some flexibility for both channels with limited wavelength tunability and when different channels exhibit different chirping characteristics. When none of the channels of input multi-wavelength IM optical signal 810 experience frequency chirping, there may be no preference as to which of the corresponding sidebands to retain.

Figure 9:
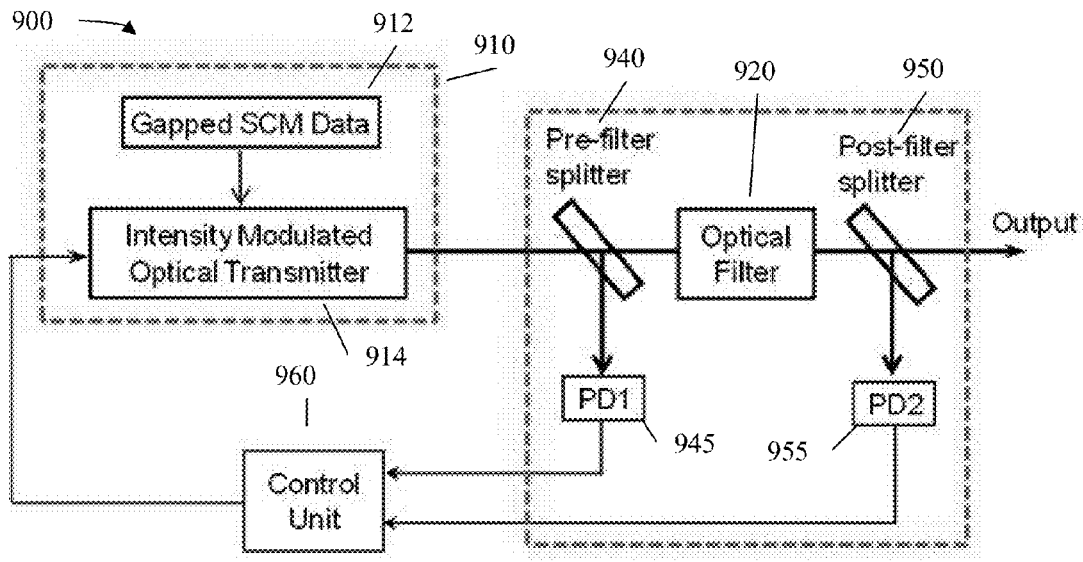
FIG. 9 is a schematic diagram of an embodiment of an IM-Tx configured to generate an optical signal with gapped, unbalanced optical sidebands, and provide wavelength locking.

FIG. 9 is a schematic diagram of an embodiment of an IM-Tx 900 configured to generate an optical signal with gapped, unbalanced optical sidebands, and provide wavelength locking. IM-Tx 900 may comprise SCM-Tx 910 and optical filter 920, which may be similar to SCM-Tx 210 and optical filter 220 of FIG. 2, respectively. SCM-Tx 910 may comprise SCM data block 912 and IM E/O modulator 914, which may be similar to SCM data block 212 and IM E/O modulator 214, respectively. IM-Tx 900 may further comprise a pre-filter splitter 940, a first photodetector 945, a post-filter splitter 950, a second photodetector 955, and a control unit 960, which may enable wavelength locking. Pre-filter splitter 940 may be configured to split an IM optical signal received from SCM-Tx 910, direct a portion of the IM optical signal to first photodetector 945, and direct a portion of the IM optical signal to optical filter 920. Post-filter splitter 950 may be configured to split a filtered IM optical signal received from optical filter 920, direct a portion of the filtered IM optical signal to a second photodetector 955, and direct a portion of the filtered IM optical signal to an output. First photodetector 945 may be configured to perform optical to electrical (O/E) conversion on the IM optical signal and output a first wavelength locking signal to control unit 960. Second photodetector 955 may be configured to perform O/E conversion on the filtered IM optical signal and output a second wavelength locking signal to control unit 960. Control unit 960 may be configured to output a wavelength locking correction signal to IM E/O modulator 914 based upon the first and second wavelength locking signals. The wavelength locking correction signal may be used by IM E/O modulator 914 to control its temperature and lock an optical carrier's wavelength. In an embodiment, first photodetector 945 and second photodetector 955 may be directly connected to pre-filter splitter 940 and post-filter splitter 950, respectively, via free space optics. An optical portion of an etalon-based wavelength locker may be implemented by this embodiment.

Figure 10:
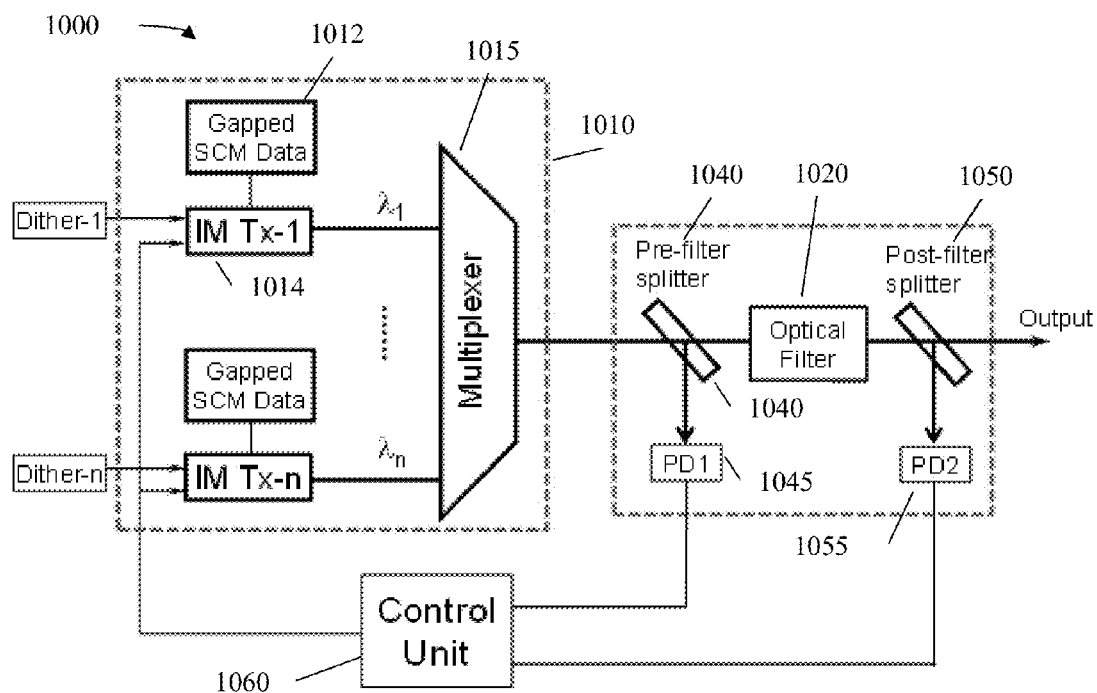
FIG. 10 is a schematic diagram of an embodiment of a multi-wavelength IM-Tx configured to generate a plurality of carrier suppressed, multi-wavelength optical signals with gapped, unbalanced optical sidebands and provide wavelength locking.

FIG. 10 is a schematic diagram of an embodiment of a multi-wavelength IM-Tx 1000 configured to generate a plurality of carrier suppressed, multi-wavelength optical signals with gapped, unbalanced optical sidebands and provide wavelength locking. Multi-wavelength IM-Tx 1000 may comprise a multi-wavelength SCM-Tx 1010 and an optical filter 1020, which may be similar to multi-wavelength SCM-Tx 710 and an optical filter 720, respectively. Multi-wavelength IM-Tx 1000 may further comprise a wavelength locker comprising a pre-filter splitter 1040, a first photodetector 1045, a post-filter splitter 1050, a second photodetector 1055, and a control unit 1060, which may enable wavelength locking. Pre-filter splitter 1040 may be configured to split an input multi-wavelength IM optical signal received from multi-plexer 1015, direct a portion of the input multi-wavelength IM optical signal to first photodetector 1045, and direct a portion of the input multi-wavelength IM optical signal to optical filter 1020. The input multi-wavelength IM optical signal may comprise a plurality of low frequency pilot tone signals. Each of the plurality of pilot tone signals may identify a channel and its corresponding IM-E/O modulator 1014. Post-filter splitter 1050 may be configured to split a filtered multi-wavelength IM optical signal received from optical filter 1020, direct a portion of the filtered multi-wavelength IM optical signal to a second photodetector 1055, and direct a portion of the filtered multi-wavelength IM optical signal to an output. First photodetector 1045 may be configured to perform O/E conversion on the input multi-wavelength IM optical signal and output a first wavelength locking signal to control unit 1060. Second photodetector 1055 may be configured to perform O/E conversion on the filtered multi-wavelength IM optical signal and output a second wavelength locking signal to control unit 1060. Control unit 1060 may be configured to output a wavelength locking correction signal to each of the plurality of IM-E/O modulators 1014 based upon the first and second wavelength locking signals. Each of the plurality of IM-E/O modulators 1014 may identify a corresponding channel of the wavelength locking correction signal by the dither signal corresponding to the respective IM-E/O modulator to control its temperature and lock its optical carrier's wavelength.

In an embodiment, a time-domain multiplexing (TDM) method may be used to perform wavelength locking for each of the plurality of IM-E/O modulators 1014. In this embodiment, a dither signal n corresponding to an IM-E/O modulator n may be assigned to a timeslot $t_n$. The wavelength locker may detect a carrier wavelength $\lambda_n$ corresponding to IM-E/O modulator n, based on recognition of dither signal n and instruct IM-Tx n to tune its carrier wavelength $\lambda_n$ to a target wavelength. This may be repeated for a subsequent timeslot $t_{n+1}$ corresponding to IM-E/O modulator n+1 and so on until each of the plurality of IM-E/O modulators 1014 have been wavelength locked accordingly. In another embodiment, optical filter 1020 may be any interferometric filter with periodic transmission (e.g. an etalon or multi-mirror interferometer). An FSR of optical filter free spectral range may be designed to be equal to a channel spacing of the input multi-wavelength IM optical signal and/or a sub-harmonic of the channel spacing. A filter shape of optical filter 1020 may be determined by the filter surface reflectance, the incidence angle, and/or the number of mirrors based upon a required suppression ratio of the undesired sidebands.

Figure 11:
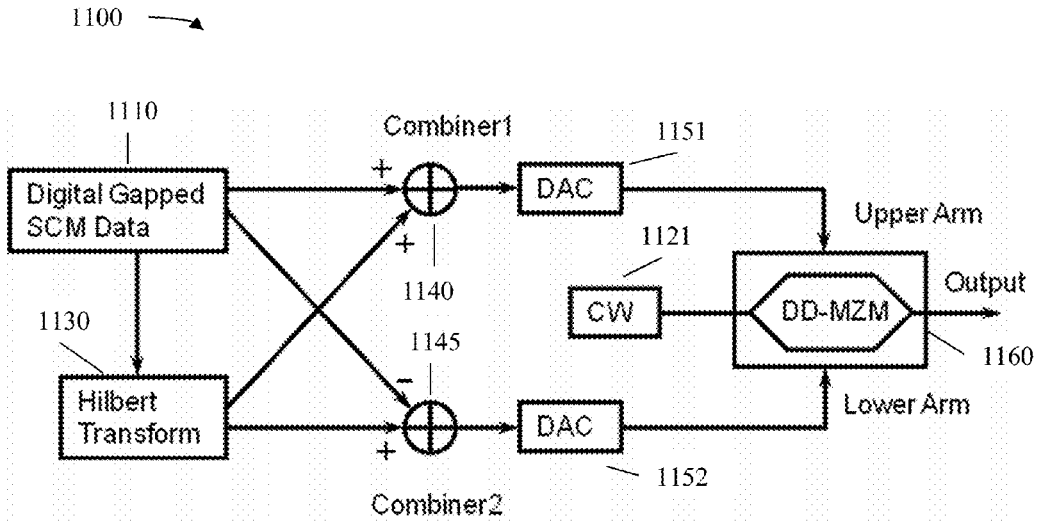
FIG. 11 is a schematic diagram of an embodiment of a dual electrode/drive Mach-Zehnder modulator (DE-MZM) Tx configured to generate an optical signal with gapped and unbalanced optical sidebands.

FIG. 11 is a schematic diagram of an embodiment of an MZM Tx 1100 configured to generate an optical signal with gapped and unbalanced optical sidebands (e.g. optical signal 100 of FIG. 1). MZM Tx 1100 may comprise a digital SCM data block 1110, a CW laser 1121, which may be similar to CW laser 321 of FIG. 3B, a Hilbert transform block 1130, a first combiner 1140, a second combiner 1145, digital-to-analog convertor (DAC) blocks 1151 and 1152, and a DD-MZM 1160. Digital SCM data block 1110 may be similar to SCM data block 212 except digital SCM data block 1110 may only generate an SCM electrical signal using DSP techniques. In an embodiment, digital SCM data block 1110 may perform data mapping for higher level formats. The SCM electrical signal may be forwarded to an input of Hilbert transform block 1130, an input of first combiner 1140, and after passing through a minus operation an input of second combiner 1145. Hilbert transform block 1130 may be configured to perform a Hilbert transform on the SCM electrical signal and forward the Hilbert transformed SCM electrical signal to an input of first combiner 1140 and second combiner 1145. First combiner 1140 may be configured to combine the SCM electrical signal and the Hilbert transformed SCM electrical signal into a first combined SCM electrical signal to be forwarded to DAC blocks 1151. The first combined SCM electrical signal may be transformed into an upper arm driving signal after being processed by DAC block 1151 and forwarded to an upper electrode of DD-MZM 1160. Second combiner 1145 may be configured to combine the SCM electrical signal (received via a minus operation) and the Hilbert transformed SCM electrical signal into a second combined SCM electrical signal to be forwarded to DAC block 1152. The second combined SCM electrical signal may be transformed into a lower arm driving signal after being processed by DAC block 1152 and forwarded to a lower electrode of DD-MZM 1160. In an embodiment, the upper and lower arm driving signals may pass through electrical amplifiers and/or drivers (not shown)

between their respective DAC block and DD-MZM 1160. A bias voltage of the upper electrode of DD-MZM 1160 may be set to introduce $$a - \frac{\pi}{4}$$

phase shift, while a bias voltage of the lower electrode may be set to introduce a $$\frac{\pi}{4}$$

phase shift. DD-MZM 1160 may be configured to modulate an optical carrier from CW laser 1121 with the upper arm driving signal and the lower arm driving signal. DD-MZM 1160 may output an SCM optical signal comprising an optical carrier with two gapped, unbalanced optical sidebands. An undesired sideband of the SCM optical signal may have a weak intensity at the output of DD-MZM 1160 that may result in a large SSSR and resemble a single sideband signal with an optical carrier. However, if the bias voltages for the upper and lower electrodes are not properly set, the undesired sideband of the SCM optical signal may increase in intensity. In an embodiment, the modulation voltages for the upper and lower electrodes may need to be set low in order to avoid higher order components, which may increase the OCSPR of the SCM optical signal. MZM Tx 1100 may further comprise an optical filter coupled to the output of DD-MZM 1160 to further suppress the optical carrier, and consequently increase the power efficiency. In another embodiment, the optical filter may also provide wavelength locking for CW laser 1121. DD-MZM 1160 may also be configured to generate multi-wavelength SCM optical signals comprising suppressed carriers with gapped, unbalanced sidebands.

Figure 12:
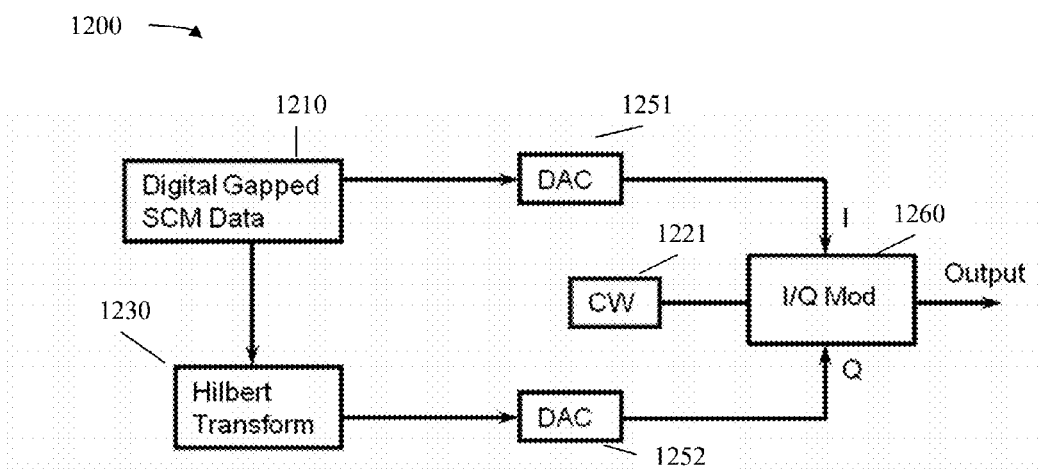
FIG. 12 is a schematic diagram of an embodiment of an in-phase/quadrature modulator (I/Q) Tx configured to generate an optical signal with gapped and unbalanced optical sidebands.

FIG. 12 is a schematic diagram of an embodiment of an I/Q-Tx 1200 configured to generate an optical signal with gapped and unbalanced optical sidebands (e.g. optical signal 100 of FIG. 1). I/Q-Tx 1200 may comprise a digital SCM data block 1210, which may be similar to digital SCM data block 1110 of FIG. 11, a CW laser 1221, which may be similar to CW laser 321 of FIG. 3B, a Hilbert transform block 1230, which may be similar to Hilbert transform block 1130 of FIG. 11, DAC blocks 1251 and 1252, which may be similar to DAC blocks 1151 and 1152 of FIG. 11 respectively, and an I/Q modulator 1260. I/Q modulator 1260 may comprise two child MZMs (C-MZMs) and a parent MZM (P-MZM). Digital SCM data block 1210 may forward an SCM electrical signal to an input of Hilbert transform block 1230, and DAC block 1251. Hilbert transform block 1230 may forward a Hilbert transformed SCM electrical signal to DAC block 1252. The SCM electrical signal may be transformed into an in-phase driving signal after being processed by the DAC block and forwarded to an in-phase input of I/Q modulator 1260. The Hilbert transformed SCM electrical signal may be transformed into a quadrature driving signal after being processed by the DAC block and forwarded to a quadrature input of I/Q modulator 1260. Thus, the quadrature driving signal is a Hilbert transform of the in-phase driving signal, and consequently is not independent. In an embodiment, the in-phase and quadrature driving signals may pass through electrical amplifiers and/or drivers (not shown) between their respective DAC block and I/Q modulator 1260. I/Q modulator 1260 may modulate an optical carrier from CW laser 1221 with the in-phase and quadrature driving signals in corresponding C-MZMs. I/Q modulator 1260 may combine the outputs of two C-MZMs as an input to the P-MZM, with a π/2 phase shift introduced between the in-phase and quadrature channels, and generate an SCM optical signal. The SCM optical signal may comprise an optical carrier with two gapped, unbalanced optical sidebands. Unbalanced sidebands may be generated by I/Q-Tx 1200 by biasing both the C-MZMs away from a null point. In an embodiment, a preferred bias point may depend on a driving swing of the in-phase and quadrature channels and may be close to the null point. In this embodiment, the optical carrier may have a similar intensity as the optical sidebands. Also, increasing the preferred bias point away from the null point may increase the OCSPR, while decreasing the preferred bias point towards the null point may reduce the OCSPR. An undesired sideband of the SCM optical signal may have a weak intensity at the output of I/Q modulator 1260 that may result in a large SSSR and resemble a single sideband signal with an optical carrier.

Figure 13:
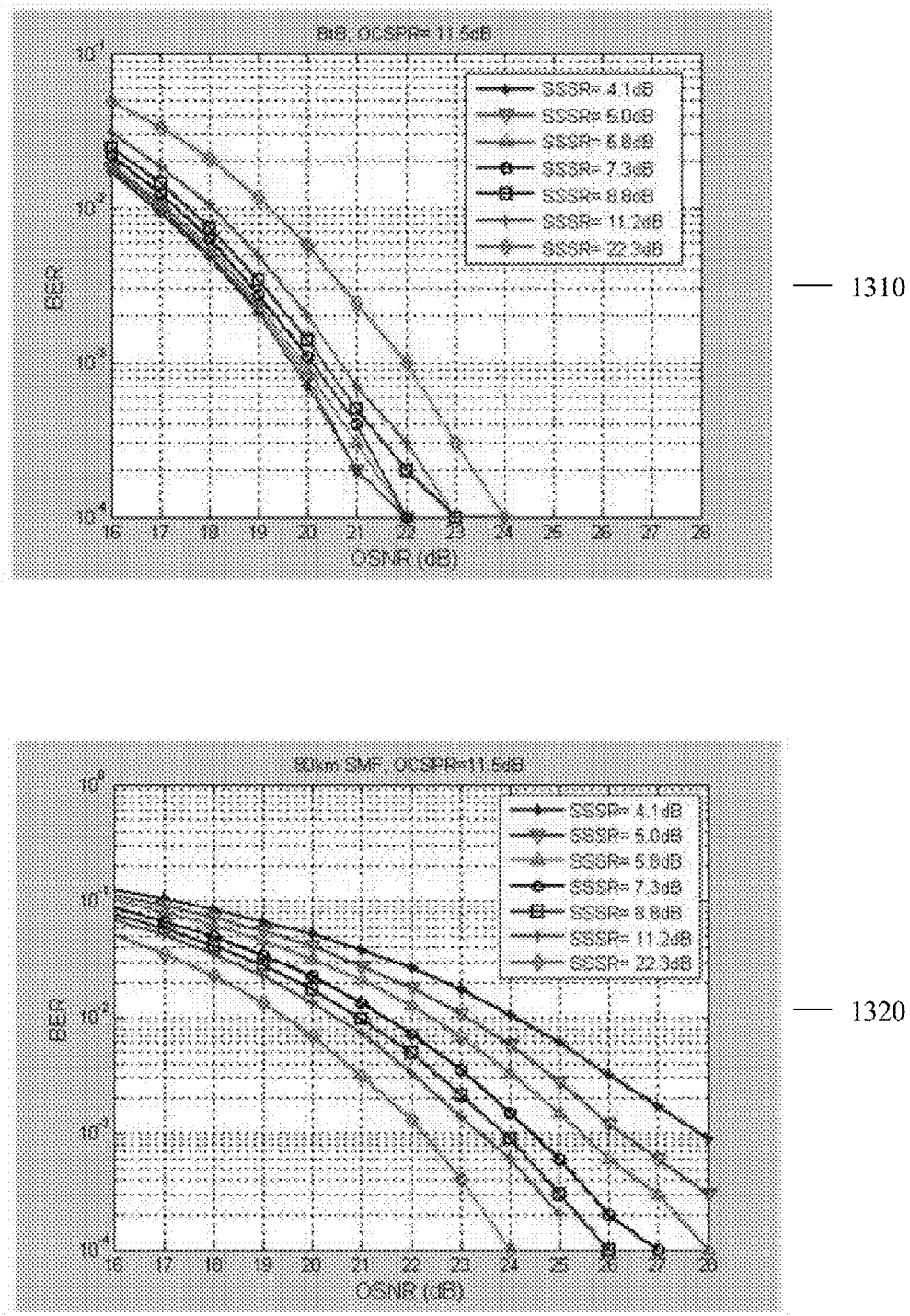
FIG. 13 shows Bit Error Rate (BER) versus optical-to-signal ratio (OSNR) waterfall curves for a gapped, unbalanced sideband and suppressed carrier optical transmission simulation implementing varying single sideband suppression ratios (SSSRs).

FIG. 13 shows Bit Error Rate (BER) versus optical-to-signal ratio (OSNR) waterfall curves for a gapped, unbalanced sideband and suppressed carrier optical transmission simulation implementing varying SSSRs. In the simulation of FIG. 13, an optical transmitter comprising an SCM data block was implemented using CAP modulation, in which a square-root raised-cosine Nyquist filter with a roll-off factor of 0.15 was used as a CAP filter for pulse shaping. The SCM data block introduced a separation gap between a DC and CAP signal by adjusting a subcarrier frequency of the CAP filter. The CAP signal comprised a 5 Giga-symbols per second (Gbaud/s) symbol rate and a 16QAM format, which resulted in a 20 Gigabits per second (Gb/s) line rate. An optical demultiplexer with a 3 decibel (dB) bandwidth of 80 Gigahertz (GHz) and a center frequency set at the optical carrier center frequency removed excess optical noise from the optical amplifier. A filter transmission peak of the CAP filter was set to the center frequency of the carrier. The separation gap for the simulation of FIG. 13 was approximately equal to a sideband bandwidth B (e.g. sideband bandwidth B 150 of FIG. 1) of the optical transmission. An MZM with zero chirping and biased at a quadrature point (e.g. MZM 335 of FIG. 3C) modulated an optical carrier from a CW laser with the SCM electrical signal received from the SCM data block. An etalon filter with an FSR of 50 GHz was used to implement the optical filter for unbalanced sideband generation with the filter transmission peak offset set at 8 GHz. The surface reflectance of the etalon filter was varied to change the slope of the optical filter response curve to obtain a desired SSSR. A modulation index was varied to offset changes in the OCSPR resulting from varying the surface reflectance of the etalon filter to maintain a desired OCSPR. The desired OCSPR for this simulation was set at 11.5 dB while the SSSR was varied from 4.1 dB to 22.3 dB. A 22.3 dB SSSR was not easily achievable using an etalon filter, and consequently a multi-mirror Fabry-Perot interferometer was used instead of the etalon filter for that portion of the simulation. Chart 1310 shows the BER versus OSNR waterfall curves for a BtB transmission and Chart 1320 shows the BER versus OSNR waterfall curves after an 80 kilometer (km) single mode fiber (SMF) transmission. As shown in chart 1310, a required OSNR for a given BER increases as the SSSR increases for a BtB transmission. In the BtB transmission, the undesired sideband and the desired sideband are in-phase and may constructively contribute to signal intensity after photo-detection. After an 80 km SMF transmission a lower SSSR may result in a higher transmission penalty due to fiber dispersion, which may be reduced by increasing the SSSR, as shown in chart 1320. The simulation demonstrated that the fiber dispersion induced transmission penalty may be negligible for an SSSR up to 22.3 dB. Also, a ROSNR after an 80 km SMF transmission for a 5 dB SSSR may be around 26 dB at a BER of 1e-3 or around 23 dB at a BER of 1e-2. Both of these ROSNRs may be achievable for an 80 km system with one or two optical amplifiers, and thus an upper boundary for an SSSR may be set about 5 dB.

Figure 14:
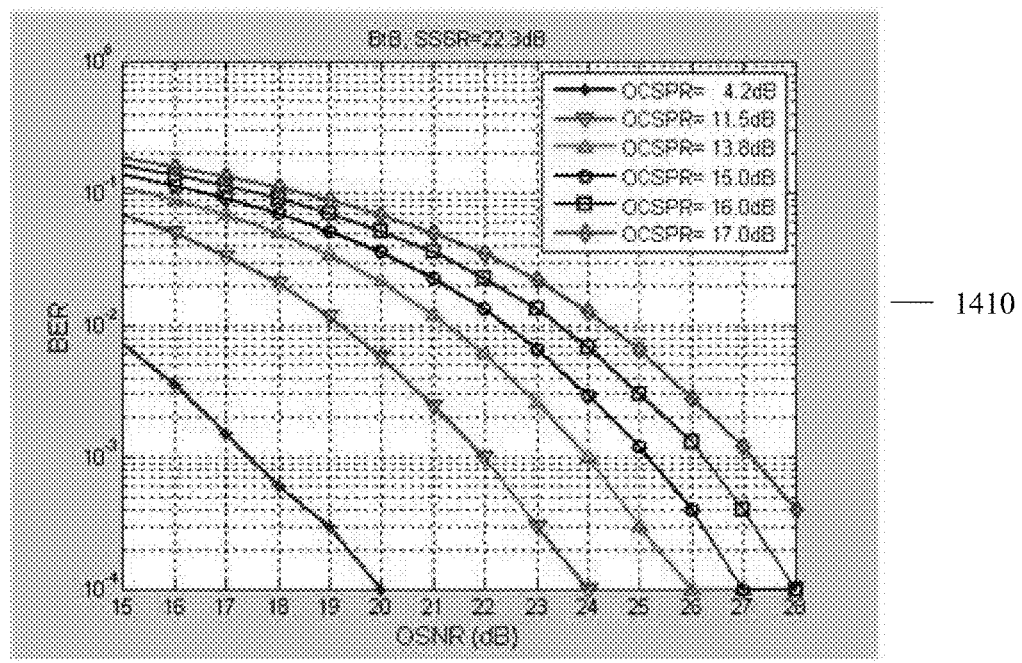
FIG. 14 shows BER versus OSNR waterfall curves for a gapped, unbalanced sideband and suppressed carrier optical transmission simulation implementing varying optical carrier-to-signal power ratios (OCSPRs).
Figure 14:
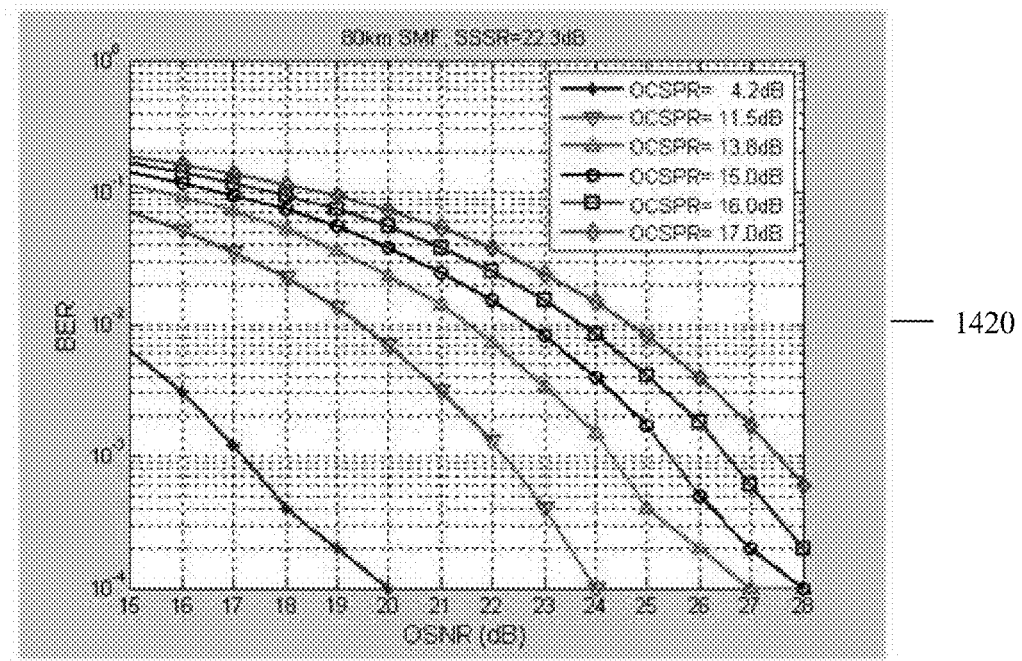

FIG. 14 shows BER versus OSNR waterfall curves for a gapped, unbalanced sideband and suppressed carrier optical transmission simulation implementing varying OCSPRs. An optical transmitter similar to the optical transmitter of FIG. 13 was used for the simulation of FIG. 14 to generate an optical SCM signal with gapped sidebands. A multi-mirror Fabry-Perot interferometer with an FSR of 100 GHz and a filter transmission peak offset set at 8 GHz was used for an optical filter to generate unbalanced sidebands. The reflectivity of two side mirrors and the middle mirror of the optical filter were selected according to a desired slope sharpness of the optical filter response curve to obtain an SSSR of 22.3 dB with a sideband separation gap approximately equal to a sideband bandwidth B (e.g. sideband bandwidth B 150 of FIG. 1). The OCSPR was varied from 4.0 dB to 17.0 dB for the simulation. The SSSR was large enough to make the fiber dispersion induced transmission penalty negligible for the range of OCSPRs tested. Chart 1410 shows the BER versus OSNR waterfall curves for BtB transmission and Chart 1420 shows the BER versus OSNR waterfall curves after an 80 km SMF transmission. The simulation demonstrated that ROSNR may increase for both the BtB and 80 km SMF transmissions as the OCSPR is increased. Also, a ROSNR after an 80 km SMF transmission for an OCSPR of 15 dB may be less than 26 dB at a BER of 1e-3 or around 23 dB at a BER of 1e-2. Both of these ROSNRs may be achievable for an 80 km system with one or two optical amplifiers, and thus an upper boundary for an OCSPR may be set at +15 dB. Similarly, a lower boundary for an OCSPR may be set at −15 dB. An OCSPR of less than 0 dB may not be easy to realize when using IM with optical filtering for unbalanced sideband generation as it may require higher carrier suppression and a very sharp slope of the optical filter response curve, which may increase the transmission loss. An OCSPR of less than 0 dB when using I/Q modulation for unbalanced sideband generation may be realized as the bias voltage is set between an optimal bias point and a transmission null point.

Figure 15:
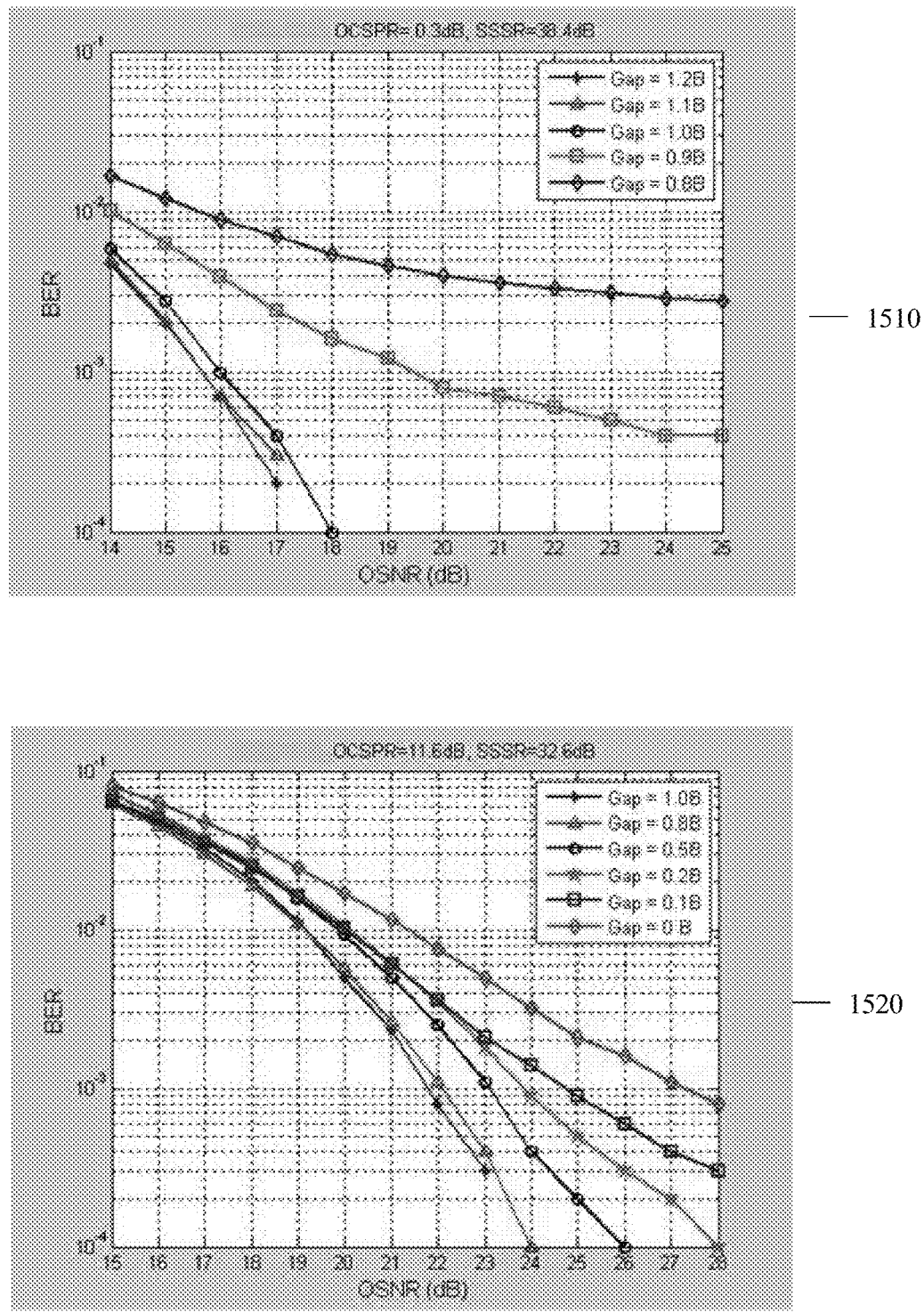
FIG. 15 shows BER versus OSNR waterfall curves for a gapped and unbalanced sideband optical transmission simulation implementing varying sideband separation gaps.

FIG. 15 shows BER versus OSNR waterfall curves for a gapped and unbalanced sideband optical transmission simulation implementing varying sideband separation gaps. An optical transmitter comprising an I/Q modulator (e.g. I/Q modulator 1260 of FIG. 12) was used for the simulation of FIG. 15 to generate an optical SCM signal with gapped sidebands. A sufficiently large SSSR was set to make the fiber dispersion induced transmission penalty negligible so that only a BtB simulation may be required. The OCSPR was varied in addition to the sideband separation gap due to dependence between the two parameters. Chart 1510 shows the BER versus OSNR waterfall curves for a BtB case with an SSSR of 38.4 dB and an OCSPR of 0.3 dB, which was realized by setting the bias voltage slightly above the I/Q modulator's null point. The simulation demonstrated that increasing the sideband separation gap from 1.0 to 1.1 times the sideband bandwidth resulted in only a marginal improvement of the ROSNR, as shown by chart 1510. Also, increasing the sideband separation gap above 1.1 times the sideband bandwidth resulted in no improvement of the ROSNR. However, decreasing the sideband separation gap from 1.0 to 0.9 times the sideband bandwidth resulted in a significant degradation of the ROSNR at a BER of 0.1%. Thus, the sideband separation gap should be sufficiently wide when the OCSPR is low to accommodate a stronger signal-signal (or subcarrier-subcarrier) beating induced interference. Chart 1520 shows the BER versus OSNR waterfall curves for a BtB case with a higher OCSPR of 11.6 dB, which was realized by setting the bias voltage further away from the I/Q modulator's transmission null point. The higher OCSPR may make an optical transmitter more tolerant of a sideband separation gap reduction. A relatively high ROSNR of about 22 dB at a BER of 1e-3 was demonstrated due to the high OCSPR when the sideband separation gap was set at 1.0 times the sideband bandwidth. Decreasing the sideband separation gap from 1.0 to 0.8 times the sideband bandwidth resulted in only a slight degradation of the ROSNR. Further decreasing the sideband separation gap did further degrade the ROSNR. However, a ROSNR of about 27 dB at a BER of 1e-3 was still obtainable with a sideband separation gap of 0. A ROSNR of less than 26 dB at a BER of 1e-3 was obtainable when a sideband separation gap of 0.1 times the sideband bandwidth. Thus, a lower boundary for a sideband separation gap of 0.1 times the sideband bandwidth may be set.

Figure 16:
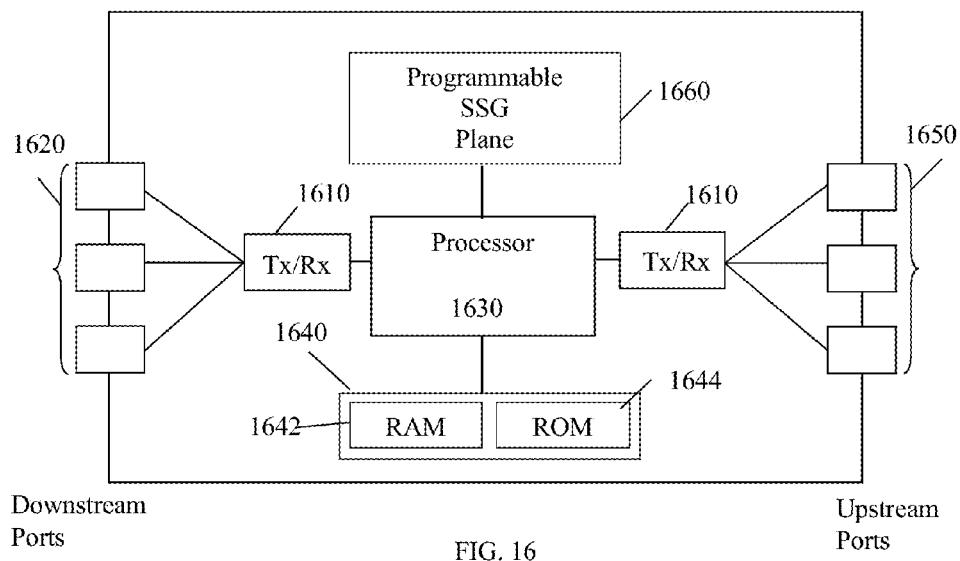
FIG. 16 is a schematic diagram of an embodiment of a network element.

At least some of the features/methods described in the disclosure may be implemented in a network element (NE). For instance, the features/methods of the disclosure may be implemented using hardware, firmware, and/or software installed to run on hardware. For example, the NE may be any device that transports data through a network, e.g., a switch, router, bridge, server, client, etc. FIG. 16 is a schematic diagram of an embodiment of a NE 1600, which may comprise SCM data block 212, IM E/O modulator 214, and/or optical channel 220. For instance, NE 1600 may be configured to handle pilot subcarriers and preambles.

NE 1600 may comprise one or more ingress ports or faces coupled to a transceiver (Tx/Rx) 1610, which may be transmitters, receivers, or combinations thereof. A Tx/Rx 1610 may be coupled to plurality of downstream ports 1620 for transmitting and/or receiving gapped SCM electrical signals from other nodes, a Tx/Rx 1610 coupled to plurality of upstream ports 1650 for transmitting and/or receiving gapped SCM electrical signals from other nodes. A processor 1630 may be coupled to the Tx/Rxs 1610 to process the gapped SCM electrical signals and/or determine the nodes to which to send the gapped SCM electrical signals. The processor 1630 may comprise one or more multi-core processors and/or memory modules 1640, which may function as data stores, buffers, etc. Processor 1630 may be implemented as a general processor or may be part of one or more application specific integrated circuits (ASICs) and/or DSPs. The downstream ports 1620 and/or upstream ports 1650 may contain electrical and/or optical transmitting and/or receiving components. NE 1600 may also comprise a programmable sideband separation gap (SSG) plane block 1660. The programmable SSG plane block 1660 may be configured to implement SSG functions, such as at an application layer or layer 3 (L3) in the Open Systems Interconnection (OSI) model, where the sideband separation gaps may be updated based on an updated OCSPR. Such SSG information may be maintained in a content table at the memory module 1640. The programmable SSG plane block 1660 may then forward the updated SSG information to an SCM data block (e.g. SCM data block 212 of FIG. 2). The programmable SSG plane block 1660 may be implemented using software, hardware, or both and may operate above the internet protocol (IP) layer or layer 2 (L2) in the OSI model. The memory module 1640 may comprise a cache 1642 for temporarily storing sideband separation gap information, e.g., a Random Access Memory (RAM). Additionally, the memory module 1640 may comprise a long-term storage 1644 for storing content relatively longer, e.g., a Read Only Memory (ROM). For instance, the cache 1642 and the long-term storage 1644 may include Dynamic random-access memories (DRAMs), solid-state drives (SSDs), hard disks, or combinations thereof. Notably, the memory module 1640 may be used to house the instructions for carrying out the system and methods described herein.

It is understood that by programming and/or loading executable instructions onto NE 1600, at least one of the processors 1630, cache 1642, and long-term storage 1644 are changed, transforming NE 1600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a transmitter configured to generate an optical signal comprising a carrier modulated with at least two sidebands modulated with information,
wherein the information introduces a separation gap in a frequency domain between the sidebands and the carrier,
wherein one of the sidebands is an undesired sideband and another one of the sidebands is a desired sideband,
wherein the sidebands are unbalanced due to the desired sideband having a higher power intensity than the undesired sideband prior to transmission,
wherein the information comprises a sub-carrier modulated (SCM) signal and a direct component (DC), and
wherein the separation gap is introduced through a gap between the SCM signal and the DC.

2. The apparatus of claim 1, wherein the carrier is generated by a light source, and wherein the information is modulated using a multi-level modulation format.

3. The apparatus of claim 2, wherein the carrier is modulated by intensity modulation (IM).

4. The apparatus of claim 3, wherein the IM introduces a frequency chirp on the optical signal, wherein the higher power intensity of the desired sideband is due to the frequency chirp, and wherein the undesired sideband requires either less suppression or no suppression.

5. The apparatus of claim 3, further comprising an optical filter coupled to the transmitter that is configured to transform the optical signal into a filtered optical signal comprising a suppressed carrier and a suppressed undesired sideband.

6. The apparatus of claim 5, wherein the carrier is modulated by direct IM.

7. The apparatus of claim 5, wherein the carrier is modulated by external IM, and wherein the light source is a continuous wave (CW) laser.

8. The apparatus of claim 7, wherein the external IM is performed by an electro-absorption modulator (EAM) or a Mach-Zehnder modulator (MZM).

9. The apparatus of claim 5, further comprising:
a first photodetector;
a first splitter intervening between the transmitter and the optical filter configured to direct a portion of the optical signal to the first photodetector and a portion to an input of the optical filter;
a second photodetector;
a second splitter coupled to an output of the optical filter and configured to direct a portion of the filtered optical signal to the second photodetector; and
a control unit configured to:
receive a first signal from the first photodetector and a second signal from the second photodetector;
generate a wavelength locking signal based upon the first and second signals; and
forward the wavelength locking signal to the transmitter, wherein the light source comprises a wavelength that is adjusted in response to the wavelength locking signal.

10. The apparatus of claim 2, wherein the carrier is modulated with a dual electrode Mach-Zehnder modulator (DE-MZM), wherein an upper arm driving signal of the DE-MZM comprises a combination of the information and a Hilbert transform of the information, wherein a lower arm driving signal of the DE-MZM comprises the information subtracted from the Hilbert transform of the information, and wherein the undesired sideband is suppressed in an output of the DE-MZM.

11. The apparatus of claim 2, wherein the carrier is modulated with an in-phase/quadrature (I/Q) modulator, wherein an in-phase driving signal of the I/Q modulator comprises the information, wherein a quadrature driving signal of the I/Q modulator comprises a Hilbert transform of the information, and wherein the undesired sideband is suppressed in an output of the I/Q modulator.

12. The apparatus of claim 2, wherein the carrier comprises a center frequency, wherein the sidebands comprise a 3 decibel (dB) bandwidth, and wherein the separation gap is defined by a product of a scaling factor and the 3 dB bandwidth.

13. The apparatus of claim 12, wherein the optical signal comprises an optical carrier-to-signal power ratio (OCSPR) and a single sideband suppression ratio (SSSR).

14. The apparatus of claim 13, wherein the scaling factor is at least 0.1, wherein the OCSPR is in a range of −15 dB to +15 dB, and wherein the SSSR is at least 5 dB.

15. An apparatus comprising:
a plurality of transmitters, wherein each of the transmitters is configured to generate an optical signal comprising:
a carrier modulated with at least two sidebands modulated with information, wherein the information introduces a separation gap in a frequency domain between the sidebands and the carrier, wherein one of the sidebands is an undesired sideband and another one of the sidebands is a desired sideband, wherein the sidebands are unbalanced due to the desired sideband having a higher power intensity than the undesired sideband prior to transmission, wherein the information comprises a sub-carrier modulated (SCM) signal and a direct component (DC), and wherein the separation gap is introduced through a gap between the SCM signal and the DC; and
a dither signal, wherein the dither signal uniquely identifies the transmitter; and
a multiplexer coupled to the plurality of transmitters, wherein each of the optical signals is centered at a unique wavelength, and wherein the multiplexer is configured to transform the plurality of optical signals into a multiplexed optical signal.

16. The apparatus of claim 15, further comprising an optical filter coupled to the multiplexer and configured to transform the multiplexed optical signal into a filtered multiplexed optical signal comprising a plurality of filtered optical signals, wherein each of the filtered optical signals comprise a retained desired sideband, a suppressed carrier, and a suppressed undesired sideband.

17. The apparatus of claim 16, further comprising:
a first photodetector;
a first splitter intervening between the multiplexer and the optical filter configured to direct a portion of the multiplexed optical signal to the first photodetector and a portion to an input of the optical filter;
a second photodetector;
a second splitter coupled to an output of the optical filter and configured to direct a portion of the filtered multiplexed optical signal to the second photodetector; and
a control unit configured to:
receive a first signal from the first photodetector and a second signal from the second photodetector;
generate a wavelength locking signal for each of the plurality of transmitters based upon the dither signal, the first signal, and the second signal; and
forward the wavelength locking signal to each of the plurality of transmitters, wherein the light source comprises a wavelength that is adjusted in response to the wavelength locking signal.

18. An apparatus comprising:
a plurality of transmitters, wherein each of the transmitters is configured to generate an optical signal comprising:
a carrier modulated with at least two sidebands modulated with information, wherein the information introduces a separation gap in a frequency domain between the sidebands and the carrier, wherein one of the sidebands is an undesired sideband and another one of the sidebands is a desired sideband, and wherein the sidebands are unbalanced due to the desired sideband having a higher power intensity than the undesired sideband prior to transmission; and
a dither signal, wherein the dither signal uniquely identifies the transmitter; and
a multiplexer coupled to the plurality of transmitters, wherein each of the optical signals is centered at a unique wavelength, and wherein the multiplexer is configured to transform the plurality of optical signals into a multiplexed optical signal,
wherein the multiplexer comprises a plurality of passbands corresponding to each of the plurality of optical signals, wherein each of the plurality of passbands comprises a filter response curve,
wherein the filter response curve comprises a lower amplitude response at a center frequency of the carrier than at a center frequency of the desired sideband, and wherein the carrier and the undesired sideband are suppressed by the lower amplitude response.

19. A method comprising:
receiving an optical carrier from a light source;
modulating the optical carrier with at least two sidebands modulated with information, wherein the information introduces a separation gap in a frequency domain between the sidebands and the optical carrier, wherein one of the sidebands is an undesired sideband and one of the sidebands is a desired sideband, and wherein the sidebands are unbalanced due to the desired sideband having a higher power intensity than the undesired sideband prior to transmission;
suppressing the carrier with an optical filter prior to the transmission;
generating a wavelength locking signal based upon samples of the optical signal taken before and after the optical filter; and
locking a wavelength of the light source based upon the wavelength locking signal.

20. The method of claim 19, wherein the information comprises a sub-carrier modulated (SCM) signal and a direct component (DC), and wherein the separation gap is introduced through a gap between the SCM signal and the DC.

* * * * *